United States Patent [19]

Yun

[11] Patent Number: 5,240,721
[45] Date of Patent: Aug. 31, 1993

[54] DEVICE AND METHOD FOR CONTROLLING FERMENTATION AND ENSILAGATION OF FOOD

[75] Inventor: Kwang H. Yun, Suweon, Rep. of Korea

[73] Assignee: SamSung Electronics Co., Ltd., Suwon, Rep. of Korea

[21] Appl. No.: 738,122

[22] Filed: Jul. 30, 1991

[30] Foreign Application Priority Data

Aug. 16, 1990 [KR] Rep. of Korea .................. 90-12619

[51] Int. Cl.$^5$ ............................................... A23K 1/00
[52] U.S. Cl. ........................................ 426/49; 426/54; 426/623; 426/635; 426/807; 435/289; 435/290; 435/291; 435/801
[58] Field of Search ................. 426/231, 49, 54, 807, 426/623, 630, 635; 435/289, 290, 291, 316, 3

[56] References Cited

U.S. PATENT DOCUMENTS 3,926,738 12/1975 Wilson et al. .................. 435/290
4,293,655 10/1981 Christ et al. ...................... 426/49

Primary Examiner—R. B. Penland
Attorney, Agent, or Firm—Robert E. Bushnell

[57] ABSTRACT

A device for controlling fermentation and ensilagation of food for use with an apparatus for fermenting and ensilaging is disclosed. The device comprising a key input unit manually controlled by a user so as to set the rate of fermentation and the ripeness stage. A microprocessor controls the respective units in accordance with a preset program and in response to signals representing the present rate of fermentation and ripeness setting provided by the key input unit. A load control unit controls a heating unit and a cooling unit in response to a control signal applied thereto from the microprocessor and representing the present rate of fermentation and the ripeness stage. A temperature detecting unit detects the present temperature inside an ensilaging container and outputs a signal representing the detected temperature to the microprocessor. A displaying unit displays the respective operational states of the units in response to signal applied thereto from the microprocessor, thereby providing a desired fermented state of the materials being ensilaged by controlling the fermenting time in accordance with the preset rate of fermentation and the ripeness stage, and dropping the temperature inside the ensilaging container in order to execute an ensilaging mode of an ensilaging stage of preset three stages after the fermentation has been accomplished.

19 Claims, 6 Drawing Sheets

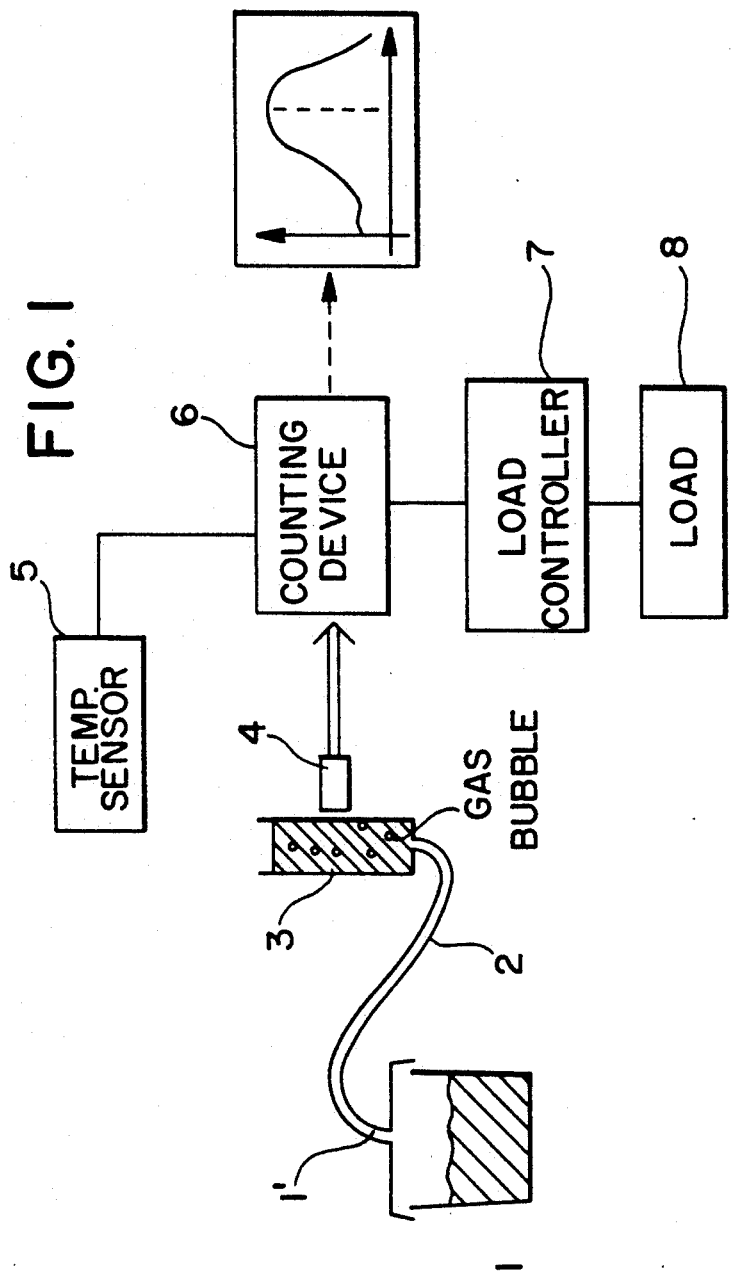

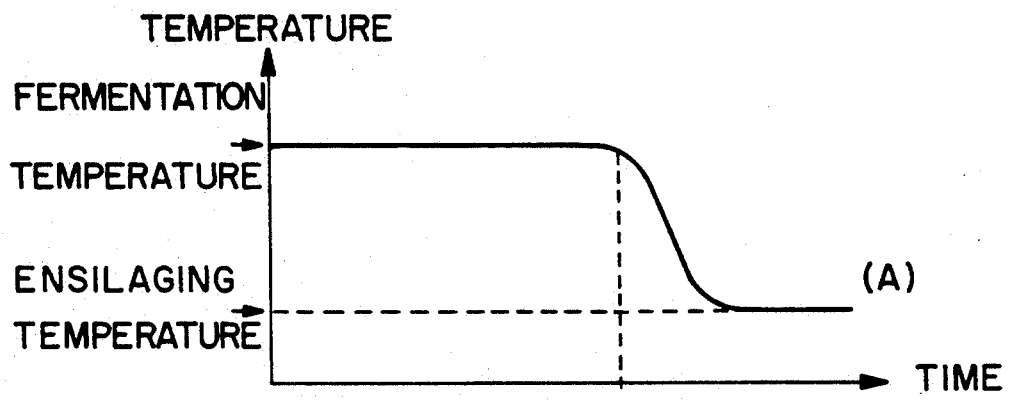
FIG. 2(A)
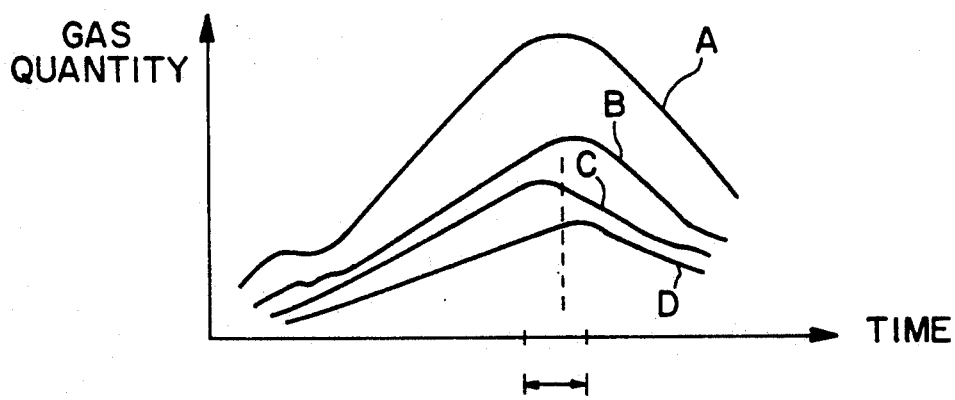
FIG. 2(B)
|  | 1ST RIP-ENESS | 2ND RIP-ENESS | OPTIMUM FERMEN-TATION | 3RD RIP-ENESS | 4TH RIP-ENESS |
|---|---|---|---|---|---|
| QUICK RATE (30°C) | 7 (NL$_1$) | 12 (NL$_2$) | 16 HR (NL$_3$) | 20 (NL$_4$) | 25 (NL$_5$) |
| NORMAL RATE (25°C) | 13 (FL$_1$) | 18 (FL$_2$) | 22 HR (FL$_3$) | 26 (FL$_4$) | 30 (FL$_5$) |
FIG. 3

DEVICE AND METHOD FOR CONTROLLING FERMENTATION AND ENSILAGATION OF FOOD

BACKGROUND OF THE INVENTION

1. Field of the Invention

The present invention relates to a device and method for controlling the fermentation and ensilagation of food capable of being so processed, and more particularly to a device and method for controlling fermentation and ensilagation for use with a container for fermenting and ensilaging. The can control the fermented state of the food by changing the fermenting time, and lower the fermenting temperature inside the fermentation and ensilaging container to an ensilaging temperature in order to ensilage the fermented materials after a predetermined fermenting time.

2. Description of the Prior Art

Generally, food which is fermented tends to be easily acidified at the room temperature, but the ensilage of fermented material is relatively difficult.

As used herein, the term "ensilage" refers to the preservation or storage of food in a moist state as a result of acidification caused by the anaerobic fermentation of carboyhydrates present in the food being treated.

The taste of the fermented material is significantly influenced by the degree of its fermentation. In the other words, a relatively high temperature causes fermentation at a faster rate but the taste of the fermented material deteriorates, while a relatively low temperature increases the time necessary for accomplishing desired fermentation. Additionally, when the fermenting temperature is frequently changed, the taste of the resulting fermented material is usually poor.

In a known apparatus for fermenting and ensilaging food, the amount of anaerobic carbon dioxide generated per unit time is monitored by a detecting and measuring device during the constant temperature fermentation process of the food contained in the ensilaging container. This type of fermenting and ensilaging apparatus allows the material being fermented for ensilagation to reach a stage at which the maximum amount of the anaerobic carbon dioxide is generated. This stage is considered as the optimum fermented stage. At this stage, the temperature inside the ensilaging container of the fermenting and ensilaging apparatus drops to the ensilaging temperature, thereby restricting further fermentation of the fermented material and keeping the fermented material cold.

This type of fermenting and ensilaging apparatus is provided with the monitoring device shown in FIG. 1 which is adapted for detecting and measuring the amount of anaerobic carbon dioxide generated per unit time.

However, the monitoring device has a very complex construction as illustrated in FIG. 1 so that it occupies considerable space inside the fermenting and ensilaging apparatus. Also, the monitoring device has another disadvantage in that a considerable amount of the generated carbon dioxide gas is exhausted out of the ensilaging container. This results in the dehydration and discoloration of the surface of the fermented material which further results in the lowering of the degree of freshness of the fermented material which in turn decreases the commercial value of the fermented material.

This type of device has still another disadvantage in that it initiates the cold ensilaging mode for the fermented material after reaching a particular fermentation state of the food, the so called optimum fermentation stage as determined by carbon dioxide output. That is, the device does not allow for any variation in the degree of fermentation of the food. Thus, the device can only provide for a single degree or stage of ripeness in the fermented material. That is the device cannot provide for a lesser degree of ripeness for those who prefer unripe material to ripe material.

U.S. Pat. No. 4,293,655 entitled "Apparatus for Ensilaging and Fermenting" is disclosed. This apparatus removes resulting anaerobic liquid from the bottom of the ensilaging container and recycles or distributes it onto top of the material being ensilaged in order to supply nutritive substance, anaerobes and moisture to the top of the material being ensilaged.

Thus, this type of apparatus prevents uneven fermentation and the deterioration of the freshness of the material being processed caused by the dehydration of the top of the material.

However this type of fermenting and ensilaging apparatus has a disadvantage in that it fails to provide a device and method for controlling the fermented state of the material being ensilaged.

SUMMARY OF THE INVENTION

It is thus an object of the present invention to provide an improved device and method for controlling fermentation and ensilagation for use with a container in which the above described disadvantages may be overcome and in which the ripeness stage for the material being ensilaged is controlled by varying the fermentation time at a predetermined temperature without the need of using a monitoring device for detecting and measuring the amount of anaerobic carbon dioxide generated during the process.

It is another object of the present invention to provide a device and method for controlling fermentation and ensilage for use with a container for fermenting and ensilaging in which the rate of fermentation and the stage of ripeness of the food may be freely selected by the user.

It is still another object of the present invention to provide a device and method for controlling fermentation and ensilagation for use with a container for fermenting and ensilaging in which the fermentation mode for the material being ensilaged is automatically converted to the ensilaging mode the the material reached a predetermined fermented state.

The device according to the present invention comprises a key input unit manually controlled by the user so as to set the rate of fermentation and the desired ripeness, i.e. the degree of ripeness. A microprocessor controls the respective units in accordance with a preset program and in response to signals representing the present rate of fermentation and stage of ripeness provided by the key input unit. A load control unit controls a heating unit and a cooling unit in response to a control signal applied thereto representing the present rate of fermentation and stage of ripeness from the microprocessor. A temperature detecting unit detects the present temperature inside the ensilaging container and outputs a signal representing the temperature detected. A displaying unit displays the respective present operational states of the units in response to a signal applied thereto from the microprocessor, thereby providing the desired fermented state of the food by determining the rate of fermentation and the stage of ripeness.

In a further aspect of the present invention, the above-mentioned objects of the present invention can be achieved by a method for controlling the fermentation and ensilage in a container apparatus for fermenting and ensilaging. The method comprises the steps of first determining whether the present mode in the fermentation and ensilaging container is the fermentation mode. If the answer is "yes", i.e. if the contents of the container are in the fermentation mode, then it is determined whether the present rate of fermentation has been set as the "quick rate". If the "quick rate" fermentation rate has been set, the heating unit is powered in order to maintain the temperature inside the ensilaging container at 30° C. But, if the "quick rate" of fermentation has not been set, the temperature inside the ensilaging container is maintained at 25° C. If the answer is "no", i.e. the contents of the container are not in the fermentation mode, then the ensilaging mode is executed.

The ripeness stage is determined simultaneously with maintaining the fermenting temperature which is determined in the present mode determining step as the temperature inside the ensilaging container.

Then it is determined whether the predetermined fermenting time corresponding to the determined ripeness stage has lapsed. If it is determined that the predetermined fermenting time has lapsed, then the ensilaging mode is executed.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic view illustrating the structure of a known device for monitoring the amount of anaerobic carbon dioxide generated in a fermenting and ensilaging apparatus;

FIGS. 2A and 2B are graphs illustrating the fermenting temperature and the amount of generated carbon dioxide as a function of the time, respectively, thereby illustrating the relation therebetween;

FIG. 3 is a table illustrating the relation between the fermenting temperature and fermenting time in each stage of ripeness;

DESCRIPTION OF THE PREFERRED EMBODIMENTS

FIGS. 2A and 2B are graphs which illustrate the relation between the fermenting temperature and the amount of carbon dioxide generated. It is shown that the maximum amount of carbon dioxide generated is generated in about the same time without regard to the amount of the material being ensilaged. However, there is a difference between the respective amounts of carbon dioxide generated by a large amount of the material being ensilaged (the curve A in FIG. 2B) and by smaller amounts of the material being ensilaged (the curves B to D in FIG. 2B).

In the same manner, the times at which the maximum amount of carbon dioxide is generated are, as represented at the respective curves B to D of FIG. 2B, essentially correspond to one another regardless of the material and the dressing materials. The amounts of carbon dioxide generated are different from one another.

Therefore, most of the food being ensilaged, such as pickled vegetables, can achieve the most proper degree of fermentation when fermented for a specific period of time at an optimum temperature.

Taking notice of the above aspect, the present invention can thus accomplish its above-mentioned objects by providing a control device comprising a key input unit 5, a temperature detecting unit 7, a load control unit, for driving a compressor, a fan motor, a heating unit and a microprocessor 1 for controlling said units in accordance with a preset program.

Figure 4:
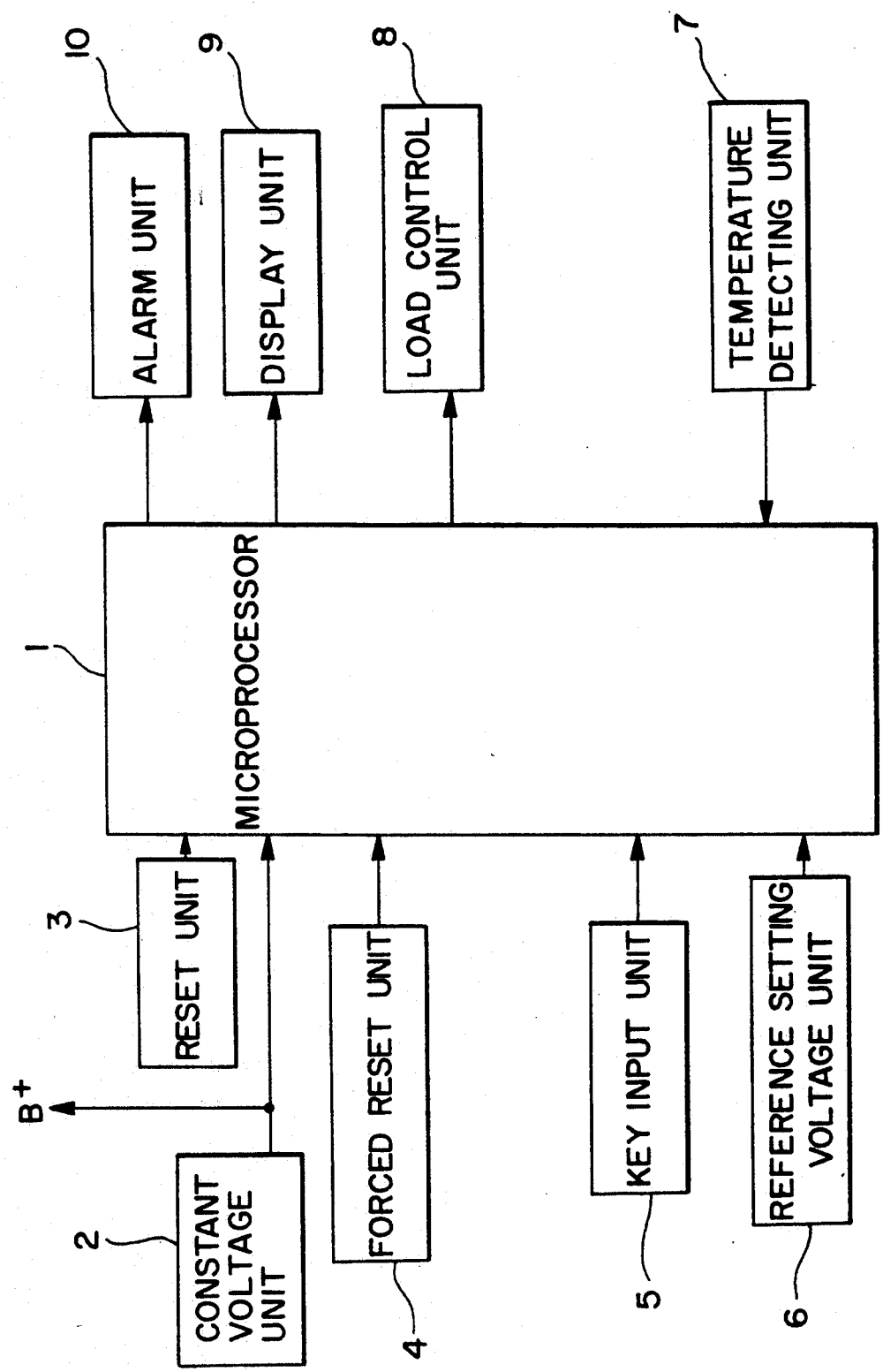
FIG. 4 is a block diagram illustrating the construction of a device for controlling a fermenting and ensilaging apparatus in accordance with this invention.

FIG. 4 is a block diagram illustrating the construction of a device for controlling the fermenting and ensilaging containing apparatus in accordance with the present invention.

The control device comprises a microprocessor 1 for controlling the respective units in accordance with a preset program for fermenting and ensilaging the foods being ensilaged, and a constant voltage unit 2 for rectifying AC power and supplying the rectified AC power to the respective units of control circuit as an operational power, a reset unit 3, a forced reset unit 4, a key input unit 5, a reference voltage setting unit 6, a temperature detecting unit 7, a load control unit 8, a display unit 9 and an alarm unit 10.

Thus the reset unit 3 is used for resetting the microprocessor 1 at the initial moment of applying of the operational power to the respective units of the control circuit. The forced reset unit 4 is used for forcibly resetting the microprocessor 1 in case of overheating caused by an overload or an operational miss step or error. The key input unit 5 includes, at least, a fermentation speed select key, a ripeness stage select key, an ensilaging temperature select key and which is adapted for being manually operated in order to output respective operational commands to the microprocessor 1. The reference voltage setting unit 6 supplies an analog to digital converted reference voltage to the microprocessor 1.

The control device according to this invention also includes the temperature detecting unit 7 for detecting the temperature inside the ensilaging container and outputting a signal representing the detected temperature inside the ensilaging container to the microprocessor 1. The load control unit is used for driving a compressor, a fan motor, the heating unit and the like under control of the microprocessor 1. The display unit 9 displays the respective operational states of the units under control of the microprocessor 1. The alarm unit 10 powers an audible buzzer or light under control of the microprocessor 1 in order to inform the operator of the respective operational functions of the units or the completion of a desired step, such as fermentation or the like.

FIG. 3 is a table illustrating the relation between fermenting temperature and fermenting time in each stage of ripeness.

As illustrated, the rate of fermentation is divided into two rates, a "normal rate" and a "quick rate". In the normal rate the fermenting temperature is maintained at 25° C., while in which quick rate the fermenting temperature is maintained at 30° C.

Also, the stage or degree of ripeness is divided into five different stages, and the fermenting time in the respective stages is set so as to be different from one another.

Figure 5A:
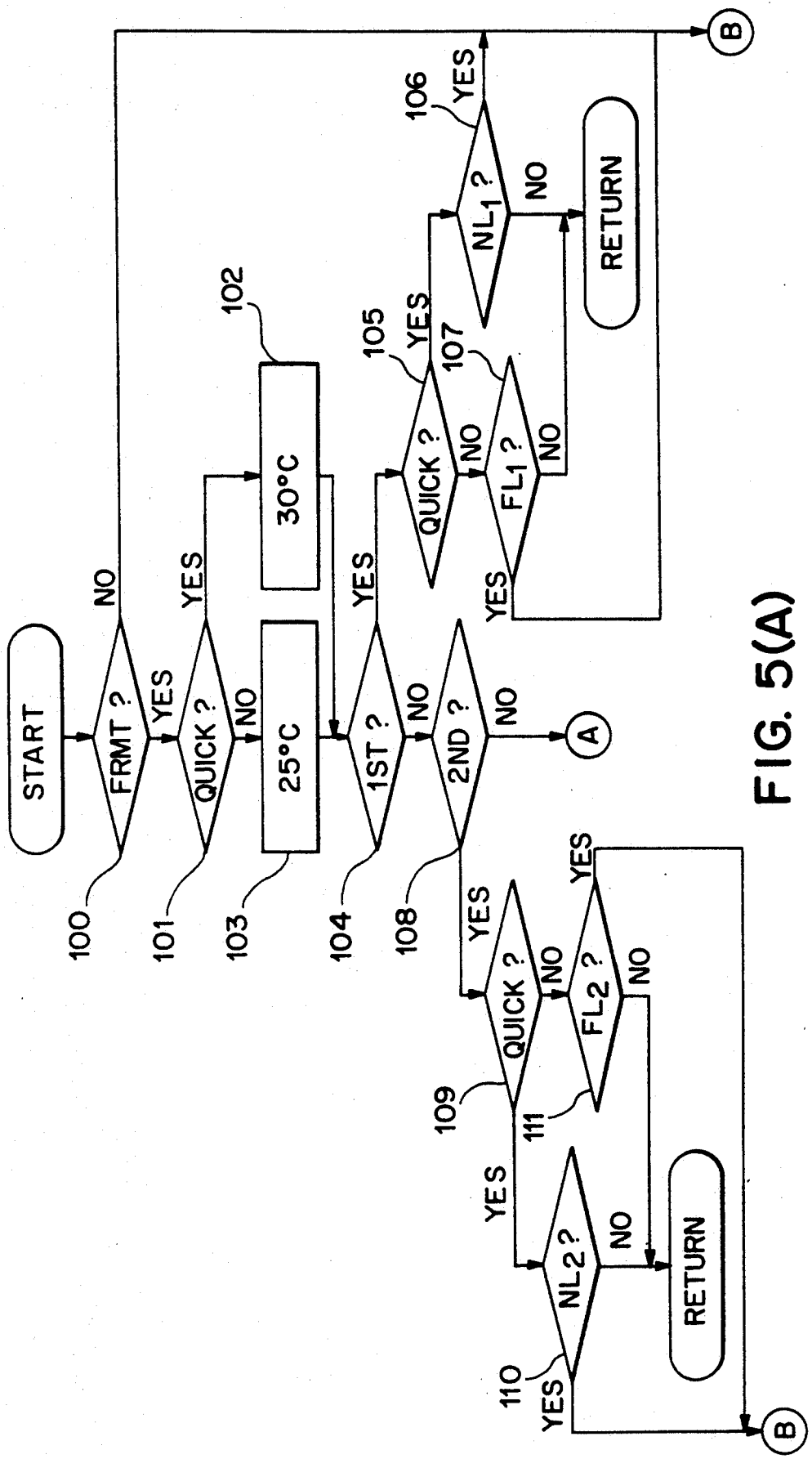
FIGS. 5A to 5C each is a flow diagram illustrating operations executed by a microprocessor of the control device of FIG. 4.
Figure 5B:
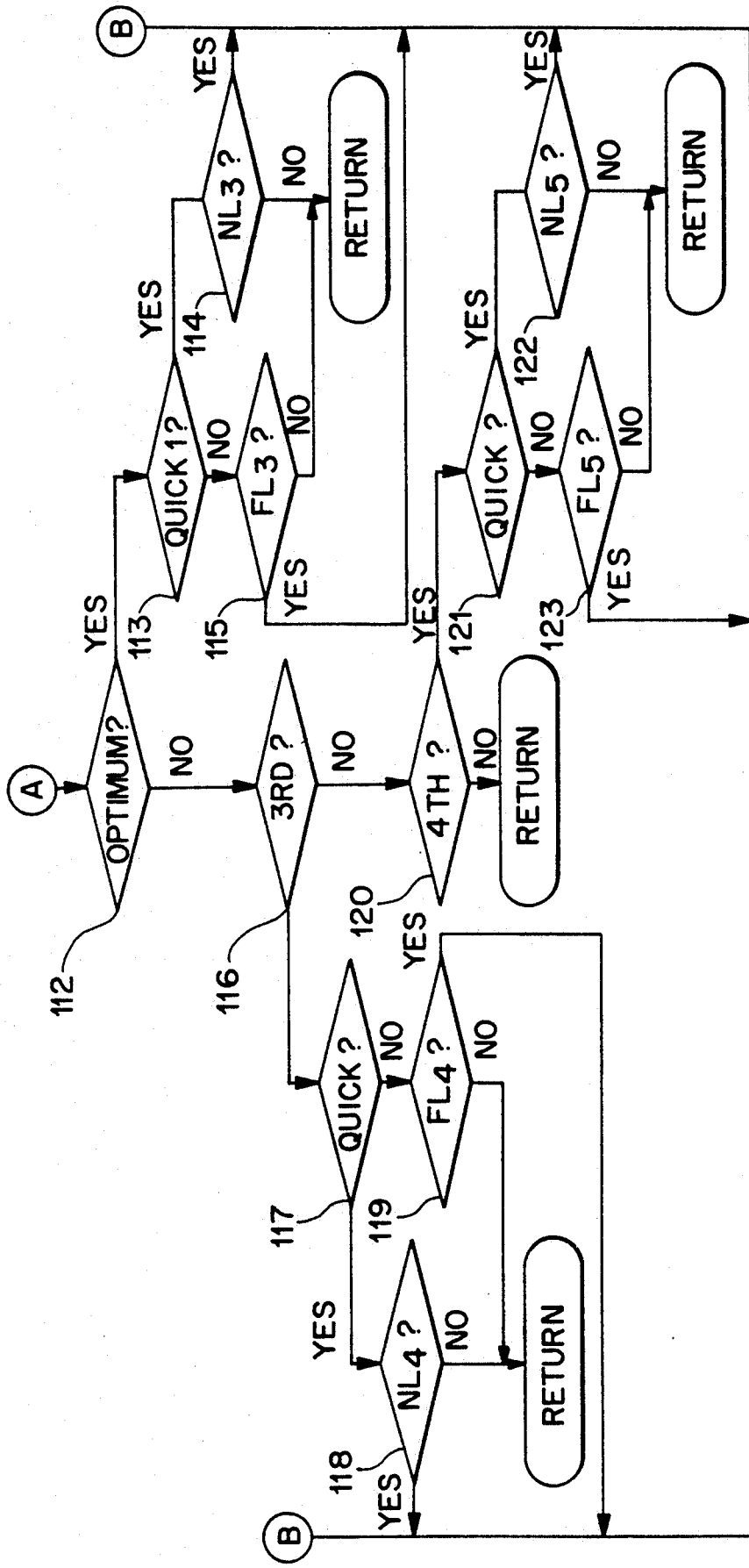
Figure 5C:
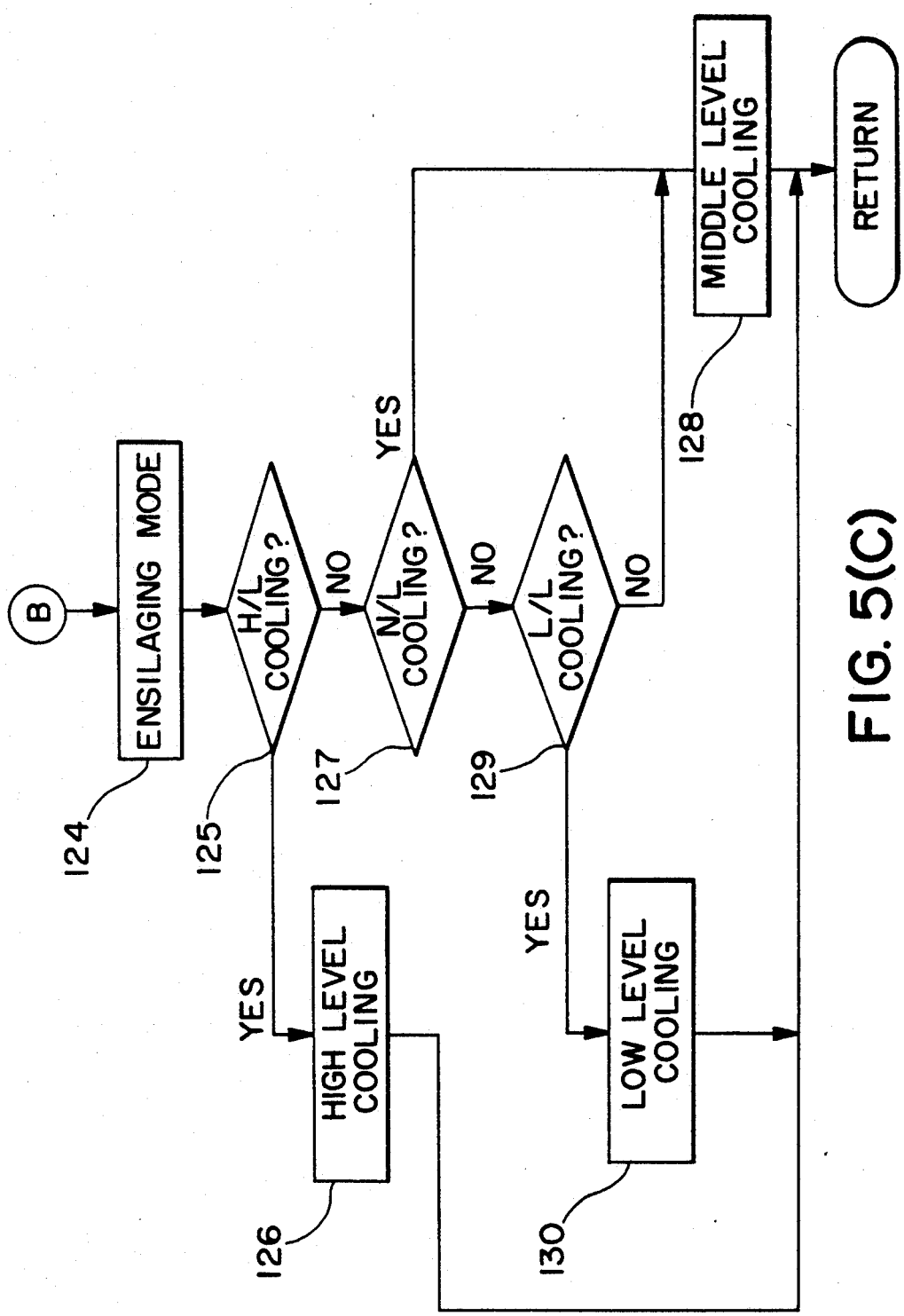

The method for controlling the device in accordance with this invention and the five stages of ripeness stages is schematically illustrated in a flow diagram of FIGS. 5A-5C.

Here, it should be understood that the number of ripeness stages, the fermenting temperature and the fermenting time can be changed as desired.

The microprocessor 1 first determines at inquiry step 100 whether the present mode is in the fermentation mode. If the answer is "no", the microprocessor 1 directly executes step 124 in which the ensilaging mode is executed.

If the answer is "yes", i.e. the present mode is in the fermentation mode, it executes the next inquiry step 101 in which it is determined whether the present rate of fermentation has been set as the "quick rate". If "quick rate" fermentation has been set, the microprocessor 1 executes step 102 in which the heating unit is powered in order to maintain the temperature inside the ensilaging container at 30° C. But, if the "quick rate" of fermentation has not been set, the temperature inside the ensilaging container is maintained at 25° C. at step 103.

Thereafter, the microprocessor 1 executes the next inquiry step 104 in which it is determined whether the stage of ripeness has been selected as a first ripeness stage. If it is determined that the first ripeness stage has been selected, the microprocessor 1 executes the next inquiry step 105 in which it is determined whether the "quick rate" of fermentation has been selected. If the answer is "yes", it is determined at the next inquiry step 106 whether a fermenting time $NL_1$ has lapsed. If the time $NL_1$ has not lapsed, the microprocessor 1 allows the fermentation mode to continue. If the time $NL_1$ has lapsed, the fermentation mode is converted into the ensilaging mode.

On the other hand, if the answer at the inquiry step 105 is "no", that is the "quick rate" of fermentation has not been selected, it is determined at step 107 whether a fermenting time $FL_1$ has lapsed. If the answer is "yes", the fermentation mode is converted into the ensilaging mode.

If the answer at the step 104 is "no", i.e. the first ripeness stage was not selected, the microprocessor 1 executes inquiry step 108 in which it is determined whether a second ripeness stage has been selected. If the second ripeness stage has been selected, the microprocessor 1 sequentially executes steps 109 and 111 in order to determine whether the "quick rate" of fermentation has been selected and fermenting times $FL_2$ and $NL_2$ have lapsed, as described in the above first ripeness stage. Thereafter, the fermentation mode is converted into the ensilaging mode.

At step 112, if it is determined that the optimum fermentation stage has been selected, the microprocessor 1 sequentially executes steps 113 to 115 in order to determine whether the quick rate of fermentation has been selected and fermenting times $FL_3$ and $NL_3$ has lapsed. Also at step 116, if it is determined that a 3rd ripeness stage has been selected, the microprocessor 1 executes steps 117 to 119 in order to determine whether the quick rate of fermentation has been selected and fermenting times $FL_4$ and $NL_4$ have lapsed.

On the other hand, at step 120, if it is determined that a 4th ripeness stage has been selected, the microprocessor 1 sequentially executes steps 121 to 123 in order to determine whether the quick rate of fermentation has been selected and fermenting times $FL_5$ and $NL_5$ have lapsed. Thereafter, at step 124 the fermentation mode is converted into the ensilaging mode.

At inquiry step 125, the microprocessor 1 determines whether the ensilaging temperature has been selected as "high level cooling". If the answer is yes, at step 126 the compressor is powered in order to maintain the temperature inside the ensilaging container at a predetermined high level cooling temperature. However at inquiry step 127, if it is determined that the ensilaging temperature has been selected as "middle level cooling", at step 128 the compressor is powered in order to maintain a predetermined middle level cooling temperature as the temperature inside the ensilaging container. Also, at inquiry step 129 if is determined that the ensilaging temperature has been selected as "low level cooling", at step 130 the compressor is powered in order to maintain a predetermined low level cooling temperature as the temperature inside the ensilaging container. However, at the inquiry step 129 the answer is "no", that is an ensilaging temperature has not been selected, the microprocessor 1 executes the step 128 in which the compressor is powered in order to maintain a predetermined middle level cooling temperature as the temperature inside the ensilaging container.

As described above, the device controlling fermentation and ensilage for fermenting and ensilaging apparatus in accordance with the present invention can ferment materials being ensilaged by simple control for the fermenting time by means of a software under a constant temperature in the ensilaging container, thereby providing an advantage in that the internal construction of the fermenting and ensilaging apparatus is compact. Furthermore, the control device according to the present invention provides another advantages in that it does not require ejection of the anaerobic carbon dioxide out of the ensilaging container so that the freshness of the materials being ensilaged does not deteriorate, thereby improving the taste of the materials, and also it is possible to allow the stage of ripeness to be freely selected in order to satisfy any taste.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A device for controlling anaerobic fermentation and ensilagation of food for use with container means for anaerobically fermenting and ensilaging the food, said device comprising:

input means for receiving a rate of fermentation and a ripeness setting;

temperature detecting means for detecting a temperature inside said container means and for generating temperature signals corresponding to said temperature detected;

computer control means for maintaining a constant fermenting temperature corresponding to said rate of fermentation for a duration corresponding to said ripeness setting by controlling operation of said device in accordance with a preset program and in response to said rate of fermentation, said ripeness setting provided by said input means, and said temperature signals; and load control means for controlling a heating unit and a cooling unit in response to first control signals from said control means.

2. A method for controlling an apparatus for anaerobically fermenting and ensilaging a food material, said method comprising the steps of:
    selecting a rate of anaerobic fermentation;
    maintaining a constant fermenting temperature inside an anaerobic fermenting and ensilaging container in accordance with the selected rate of fermentation;
    selecting a ripeness setting;
    determining whether a fermenting time corresponding to the selected ripeness setting and the selected rate of fermentation has lapsed; and
    executing an ensilaging mode when said fermenting time has lapsed, wherein the ripeness of the food material is controlled by varying only fermentation time at predetermined temperatures.

3. A method for controlling an apparatus for fermenting and ensilaging as claimed in claim 2, wherein said rate of fermentation is controlled by changing the fermenting temperature.

4. A method for controlling an apparatus for fermenting and ensilaging as claimed in claim 2, wherein a length of said fermenting time is determined in response to the selected ripeness setting.

5. A method for controlling an apparatus for fermenting and ensilaging as claimed in claim 2, wherein said ensilaging mode comprises cooling material in said fermenting and ensilaging container to a selected one of a high temperature, a middle temperature and a low temperature.

6. The method of claim 2 wherein said fermenting temperature is approximately 25° C. if the selected rate of fermentation is slow and said fermenting temperature is approximately 30° C. if the selected rate of fermentation is fast.

7. The method of claim 2 wherein said constant fermenting temperature is determined only by the rate of fermentation selected.

8. The method of claim 2 wherein said fermenting time is determined only by the ripeness setting selected and the rate of fermentation selected.

9. A device for controlling anaerobic fermentation and ensilagation of food for use with a container apparatus for holding said food, said device comprising:
    input means for receiving a fermentation speed selection, a ripeness setting selection and an ensilaging temperature selection;
    temperature detecting means for detecting a temperature inside said container apparatus and generating temperature signals representing the detected temperature;
    load control means for driving a compressor, a fan motor, and a heating unit in response to first control signals; and
    computer control means for controlling fermenting and ensilaging in accordance with a preset program in response to said fermentation speed selection, said ripeness setting selection and said ensilaging temperature selection received from said input means and said temperature signals, and for generating said first control signals received by said local control means to control the fermentation of food in said container apparatus at a constant temperature.

10. The device of claim 9 comprised of forced reset means for forcibly resetting said computer control means is said container apparatus overheats.

11. The device of claim 9 further comprised of reset means, for resetting said computer control means when operational power is applied to the device.

12. The device of claim 9 further comprised of reference voltage setting means for supplying a reference voltage to said computer control means.

13. The device of claim 9 further comprised of display means for displaying operational states of said device under control of said computer control means.

14. The device of claim 9 further comprised of alarm means for providing an audible and visible indication under control of said computer control means to inform an operator of the operational states of said device.

15. The device of claim 9 further comprised of constant voltage means for rectifying AC power and supplying the rectified AC power to at least said computer control means and said load control means.

16. A method for controlling anaerobic fermentation and ensilagation of a food material comprising:
    determining whether a present mode is a fermentation mode, if said present mode is said fermentation mode determining a present rate of fermentation, if said present mode is not said fermentation mode executing an ensilaging mode;
    when said present mode is said fermentation mode, maintaining a fermenting and ensilaging container at a constant temperature in accordance with a selected rate of fermentation;
    determining a ripeness setting selected by a user and maintaining said fermenting and ensilaging container at said constant temperature;
    determining whether a predetermined fermenting time corresponding to the determined ripeness setting and said selected rate of fermentation has lapsed; and
    executing said ensilaging mode when said predetermined fermenting time has lapsed, wherein the ripeness of the food material is controlled by varying only fermentation time at predetermined temperatures.

17. The method of claim 16 wherein the determined rate of fermentation is controlled by changing the fermenting temperature.

18. The method of claim 16 wherein said ripeness setting determines the length of the fermentation time.

19. The method of claim 16 wherein said ensilaging mode is divided into a high level cooling stage, a middle level cooling stage and a low level cooling stage.

* * * * *

UNITED STATES PATENT AND TRADEMARK OFFICE
CERTIFICATE OF CORRECTION

PATENT NO. : 5,240,721
DATED : 31 August 1993
INVENTOR(S) : Kwang-Hyun YUN

It is certified that error appears in the above-indentified patent and that said Letters Patent is hereby corrected as shown below:

Column 5,   line 61,    before "lapsed", change "has" to --have--;

Column 7,   line 37,    after " C ", delete a period " . ";

Column 8,   line 4,     after "said", change "local" to --load--;

line 10,    after "means", change "is" to --if--;

Signed and Sealed this

Twenty-second Day of October, 1996

Attest:

BRUCE LEHMAN

Attesting Officer    Commissioner of Patents and Trademarks